United States Patent
Ashrafi (10) Patent No.: US 11,346,816 B2
(45) Date of Patent: May 31, 2022

(54) APPARATUSES, SYSTEMS, AND METHODS FOR DETECTING KISSING BONDS IN BONDED JOINTS

(71) Applicant: The Boeing Company, Chicago, IL (US)

(72) Inventor: Mahdi Ashrafi, Ladson, SC (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 16/865,118

(22) Filed: May 1, 2020

(65) Prior Publication Data

US 2021/0341428 A1 Nov. 4, 2021

(51) Int. Cl.
G01N 29/04 (2006.01)
G01N 29/265 (2006.01)

(52) U.S. Cl.
CPC ......... *G01N 29/045* (2013.01); *G01N 29/043* (2013.01); *G01N 29/265* (2013.01); *G01N 2291/267* (2013.01)

(58) Field of Classification Search
CPC .. G01N 29/265; G01N 29/045; G01N 29/043; G01N 2291/267
USPC .......................................................... 73/588
See application file for complete search history.

(56) References Cited

U.S. PATENT DOCUMENTS

| | | | | |
|---|---|---|---|---|
| 4,986,102 | A | * | 1/1991 | Hendrickson ............ B21D 1/06 72/56 |
| 5,046,345 | A | * | 9/1991 | Zieve ....................... H03K 3/57 72/56 |
| 6,146,340 | A | | 11/2000 | Eizenhoefer et al. |
| 6,639,781 | B2 | * | 10/2003 | Smith ..................... G01N 3/317 361/155 |
| 7,083,327 | B1 | * | 8/2006 | Shepard ................. G01N 25/72 374/124 |
| 7,770,454 | B2 | | 8/2010 | Sokol et al. |
| 8,347,723 | B2 | | 1/2013 | Questo et al. |
| 10,495,609 | B2 | * | 12/2019 | Kim ................... G01N 29/4454 |
| 2005/0120803 | A1 | | 6/2005 | Sokol et al. |

(Continued)

OTHER PUBLICATIONS

Extended European Search Report for European Patent Application No. EP21155587.5 dated Jul. 15, 2021.

(Continued)

*Primary Examiner* — Jacques M Saint Surin
(74) *Attorney, Agent, or Firm* — Kunzler Bean & Adamson (57) ABSTRACT

Disclosed herein is a detection assembly for detecting kissing bonds in a bonded joint of a part. The detection assembly comprises an electromagnetic shockwave generator that is configured to generate an electromagnetic shockwave through a target portion of the bonded joint. The electromagnetic shockwave has an intensity sufficient to induce a separation of a kissing bond in the target portion of the bonded joint and insufficient to induce a separation of a healthy bond, adjacent the kissing bond, in the target portion. The detection assembly also comprises an ultrasonic sensor that is configured to generate a transmitted ultrasonic pulse, direct the transmitted ultrasonic pulse into the target portion of the bonded joint, and receive a received ultrasonic pulse from the target portion of the bonded joint in response to the electromagnetic shockwave generator generating the electromagnetic shockwave through the target portion of the bonded joint.

20 Claims, 6 Drawing Sheets

(56) References Cited

U.S. PATENT DOCUMENTS

| | | |
|---|---|---|
| 2011/0118994 A1 | 5/2011 | Georgeson et al. |
| 2014/0047922 A1 | 2/2014 | Adams et al. |
| 2016/0078607 A1* | 3/2016 | Georgeson ............. G06K 9/036 |
| | | 382/152 |
| 2018/0292344 A1* | 10/2018 | Kamihara ............ G01N 27/205 |
| 2019/0293610 A1* | 9/2019 | Campbell .......... G01N 29/4445 |

OTHER PUBLICATIONS

Wood et al., Ultrasonic Evaluation of Artificial Kissing Bonds in CFRP Composites, The e-Journal of Nondestructive Testing, Dec. 2014, pp. 1-10, vol. 19 No. 12, https://www.ndt.net/search/docs.php3?showForm=off&id=16911 accessed May 1, 2020.

Kundu et al., Detection of kissing bonds by Lamb waves, Ultrasonic 35, 1998, pp. 573-580, Elsevier Science B.V.

Brotherhood et al., The detectability of kissing bonds in adhesive joints using ultrasonic techniques, Ultrasonic 41, 2003, pp. 521-529, Elsevier Science B.V.

Marty et al., NDT of Kissing Bond in Aeronautical Structures, pp. 1-8, CSM Materialteknik AB, Linköping, Sweden.

\* cited by examiner

APPARATUSES, SYSTEMS, AND METHODS FOR DETECTING KISSING BONDS IN BONDED JOINTS

FIELD

This disclosure relates generally to non-destructive inspection of parts, and more particularly to apparatuses, systems, and methods for detecting kissing bonds in bonded joints of parts.

BACKGROUND

Within a bonded joint of a part, kissing bonds are portions of a bond where the bond is in intimate or direct contact with joined layers, but is either not bonded to one or both of the joined layers, or the bond has a bond strength below an acceptable level. To many conventional inspection techniques, kissing bonds have the appearance of a healthy bond. However, the bonding performance of kissing bonds is less than healthy bonds. Accordingly, detecting kissing bonds in parts is desirable to ensure the part performs as expected.

Conventional systems and methods for detecting kissing bonds in bonded joints are either too inaccurate, complex, expensive, or destructive for commercial use. For example, kissing bond detection results from shearography and mechanical testing are verified with destructive testing of the part. In other examples, thermography testing does not provide effective results for thicker parts and those with metallic cores, lamb wave testing techniques are often insensitive to kissing bonds and provide unrepeatable and inconsistent results, non-linear ultrasonic methods use two-sided access points, have low accuracy, and are difficult to implement on real parts, and laser bond inspection techniques are large and expensive to set up. Therefore, an inspection technique that can detect kissing bonds in an accurate, a simple, an inexpensive, and a non-destructive manner is desired.

SUMMARY

The subject matter of the present application has been developed in response to the present state of the art, and in particular, in response to the shortcomings of conventional systems and methods for detecting kissing bonds in bonded joints of parts, that have not yet been fully solved by currently available techniques. Accordingly, the subject matter of the present application has been developed to provide apparatuses, systems, and methods for detecting kissing bonds in bonded joints of parts that overcome at least some of the above-discussed shortcomings of prior art techniques.

The following is a non-exhaustive list of examples, which may or may not be claimed, of the subject matter, disclosed herein.

Disclosed herein is a detection assembly for detecting kissing bonds in a bonded joint of a part. The detection assembly comprises an electromagnetic shockwave generator that is configured to generate an electromagnetic shockwave through a target portion of the bonded joint. The electromagnetic shockwave has an intensity sufficient to induce a separation of a kissing bond in the target portion of the bonded joint and insufficient to induce a separation of a healthy bond, adjacent the kissing bond, in the target portion. The detection assembly also comprises an ultrasonic sensor that is configured to generate a transmitted ultrasonic pulse, direct the transmitted ultrasonic pulse into the target portion of the bonded joint, and receive a received ultrasonic pulse from the target portion of the bonded joint in response to the electromagnetic shockwave generator generating the electromagnetic shockwave through the target portion of the bonded joint. The preceding subject matter of this paragraph characterizes example 1 of the present disclosure.

The detection assembly is movable along the part. The preceding subject matter of this paragraph characterizes example 2 of the present disclosure, wherein example 2 also includes the subject matter according to example 1, above.

The electromagnetic shockwave generator and the ultrasonic sensor are non-movably fixed relative to each other. The preceding subject matter of this paragraph characterizes example 3 of the present disclosure, wherein example 3 also includes the subject matter according to example 2, above.

The ultrasonic sensor is integrated into the electromagnetic shockwave generator. The preceding subject matter of this paragraph characterizes example 4 of the present disclosure, wherein example 4 also includes the subject matter according to example 3, above.

The electromagnetic shockwave generator comprises an electromagnetic dent remover. The preceding subject matter of this paragraph characterizes example 5 of the present disclosure, wherein example 5 also includes the subject matter according to any one of examples 1-4, above.

The electromagnetic shockwave generator is directly contactable with the part when the electromagnetic shockwave generator generates the electromagnetic shockwave and when the ultrasonic sensor generates the transmitted ultrasonic pulse, directs the transmitted ultrasonic pulse into the target portion of the bonded joint, and receives the received ultrasonic pulse from the target portion of the bonded joint. The preceding subject matter of this paragraph characterizes example 6 of the present disclosure, wherein example 6 also includes the subject matter according to any one of examples 1-5, above.

Further disclosed herein is a system for detecting kissing bonds in a bonded joint of a part. The system comprises a detection assembly that comprises an electromagnetic shockwave generator. The electromagnetic shockwave generator is configured to generate an electromagnetic shockwave through a target portion of the bonded joint. The electromagnetic shockwave has an intensity sufficient to induce a separation of a kissing bond in the target portion of the bonded joint and insufficient to induce a separation of a healthy bond, adjacent the kissing bond, in the target portion. The detection assembly also comprises an ultrasonic sensor that is configured to generate an transmitted ultrasonic pulse, direct the transmitted ultrasonic pulse into the target portion of the bonded joint, and receive a received ultrasonic pulse from the target portion of the bonded joint in response to the electromagnetic shockwave generator generating the electromagnetic shockwave through the target portion of the bonded joint. The system also comprises a controller that is configured to synchronize the generation of the transmitted ultrasonic pulse relative to the generation of the electromagnetic shockwave. The preceding subject matter of this paragraph characterizes example 7 of the present disclosure.

The controller comprises an EM shockwave module and an ultrasonic sensing module. The EM shockwave module is configured to transmit a shockwave command to the electromagnetic shockwave generator. The electromagnetic shockwave generator is configured to generate the electromagnetic shockwave in response to receiving the shockwave command. The ultrasonic sensing module is configured to automatically transmit an ultrasonic wave command to the ultrasonic sensor in response to the transmission of the shockwave command by the EM shockwave module. The ultrasonic sensor is configured to generate the transmitted ultrasonic pulse in response to receiving the ultrasonic wave command. The preceding subject matter of this paragraph characterizes example 8 of the present disclosure, wherein example 8 also includes the subject matter according to example 7, above.

The ultrasonic sensor is further configured to transmit ultrasonic data that corresponds with one or more characteristics of the received ultrasonic pulse received by the ultrasonic sensor. The ultrasonic sensing module is further configured detect a kissing bond in the bonded joint based on at least the ultrasonic data. The preceding subject matter of this paragraph characterizes example 9 of the present disclosure, wherein example 9 also includes the subject matter according to example 8, above.

The electromagnetic shockwave generator and the ultrasonic sensor form a probe head. The system further comprises a robot. The probe head is fixed to and movable, along the part, by the robot. The preceding subject matter of this paragraph characterizes example 10 of the present disclosure, wherein example 10 also includes the subject matter according to any one of examples 7-9, above.

Additionally disclosed herein is a method of detecting kissing bonds in a bonded joint of a part. The method comprises generating an electromagnetic shockwave through a target portion of the bonded joint. The electromagnetic shockwave has an intensity sufficient to induce a separation of a kissing bond in the target portion of the bonded joint and insufficient to induce a separation of a healthy bond, adjacent the kissing bond, in the target portion. The method also comprises, in response to generating the electromagnetic shockwave through the target portion of the bonded joint, generating an transmitted ultrasonic pulse, directing the transmitted ultrasonic pulse into the target portion of the bonded joint, and receiving a received ultrasonic pulse from the target portion of the bonded joint. The preceding subject matter of this paragraph characterizes example 11 of the present disclosure.

The method further comprises identifying at least one characteristic of the received ultrasonic pulse, performing a comparison between the at least one characteristic of the received ultrasonic pulse and at least one predetermined characteristic, and determining a presence or absence of a kissing bond in the target portion of the bonded joint based on the comparison. The preceding subject matter of this paragraph characterizes example 12 of the present disclosure, wherein example 12 also includes the subject matter according to example 11, above.

The at least one characteristic of the received ultrasonic pulse comprises a measured signal response of the received ultrasonic pulse. The at least one predetermined characteristic comprises a predetermined signal response. The absence of a kissing bond is determined when the measured signal response is equal to the predetermined signal response. The presence of a kissing bond is determined when the measured signal response is not equal to the predetermined signal response. The preceding subject matter of this paragraph characterizes example 13 of the present disclosure, wherein example 13 also includes the subject matter according to example 12, above.

The part is made of an electrically-conductive material. The preceding subject matter of this paragraph characterizes example 14 of the present disclosure, wherein example 14 also includes the subject matter according to any one of examples 11-13, above.

The electromagnetic shockwave is generated by an electromagnetic shockwave generator. The electromagnetic shockwave generator is in direct contact with the part when the electromagnetic shockwave generator generates the electromagnetic shockwave and when the transmitted ultrasonic pulse is generated, the transmitted ultrasonic pulse is directed into the target portion of the bonded joint, and the received ultrasonic pulse is received from the target portion of the bonded joint. The preceding subject matter of this paragraph characterizes example 15 of the present disclosure, wherein example 15 also includes the subject matter according to any one of examples 11-14, above.

The method further comprises determining the intensity, of the electromagnetic shockwave, sufficient to induce a separation of a kissing bond in the target portion of the bonded joint by generating test electromagnetic shockwaves through a target portion of a bonded joint of a test part and incrementally increasing an intensity of each one of the test electromagnetic shockwaves while monitoring the test part for visual signs of anomalies. The preceding subject matter of this paragraph characterizes example 16 of the present disclosure, wherein example 16 also includes the subject matter according to any one of examples 11-15, above.

The step of determining the intensity, of the electromagnetic shockwave, sufficient to induce a separation of a kissing bond in the target portion of the bonded joint further comprises measuring a temperature of the test part after each incremental increase in the intensity of the test electromagnetic shockwaves and waiting to generate a subsequent one of the test electromagnetic shockwaves until after the temperature of the test part is at or below a predetermined threshold temperature. The preceding subject matter of this paragraph characterizes example 17 of the present disclosure, wherein example 17 also includes the subject matter according to example 16, above.

Determining the intensity, of the electromagnetic shockwave, sufficient to induce a separation of a kissing bond in the target portion of the bonded joint further comprises inspecting the test part for structural anomalies. The preceding subject matter of this paragraph characterizes example 18 of the present disclosure, wherein example 18 also includes the subject matter according to any one of examples 16-17, above.

The electromagnetic shockwave is generated by an electromagnetic shockwave generator. The transmitted ultrasonic pulse is generated by an ultrasonic sensor. The transmitted ultrasonic pulse is directed by the ultrasonic sensor. The received ultrasonic pulse is received by the ultrasonic sensor. The method further comprises co-moving the electromagnetic shockwave generator and the ultrasonic sensor into a position in which the electromagnetic shockwave directly contacts the target portion of the bonded joint. The preceding subject matter of this paragraph characterizes example 19 of the present disclosure, wherein example 19 also includes the subject matter according to any one of examples 11-18, above.

The bonded joint of the part comprises a first layer bonded to a second layer by a bond. The bond within the target portion of the bonded joint comprises the kissing bond. The electromagnetic shockwave separates the first layer from the second layer at the kissing bond to form a void between the first layer and the second layer. While the first layer and the second layer are separated by the electromagnetic shockwave, at least a portion of the transmitted ultrasonic pulse reflects off the void to form the received ultrasonic pulse. The preceding subject matter of this paragraph characterizes example 20 of the present disclosure, wherein example 20 also includes the subject matter according to any one of examples 11-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The detection assemblies, systems, and methods disclosed herein enable the detection of kissing bonds in bonded joints. Current systems and methods used to detect kissing bonds in bonded joints are either too inaccurate, complex, expensive, or destructive for commercial use. The systems and methods of the present application provide an accurate, simple, inexpensive, and non-destructive technique for detecting kissing bonds in bonded joints. Accordingly, the systems and methods of the present application promote more widespread use of bonding, particularly adhesive bonding, in high-precision and high-performance industries, such as the aeronautical industry.

Figure 1:
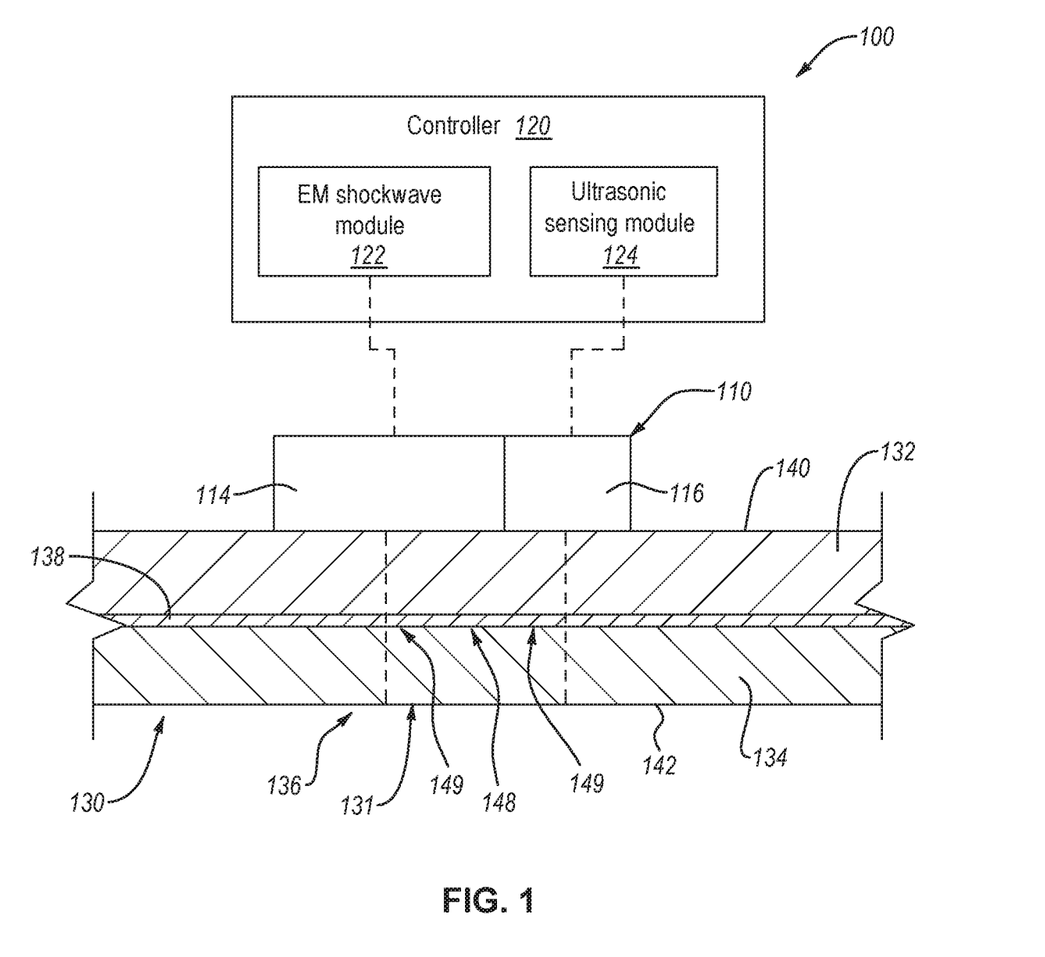
FIG. 1 is a schematic, elevation view of a system for detecting kissing bonds in a bonded joint of a part, according to one or more examples of the present disclosure.

Referring to FIG. 1, according to one example, a system 100 for detecting kissing bonds 148 in a bonded joint 136 of a part 130 is shown. The part 130 can be any of various parts of any of various structures. In some examples, the part 130 forms all or a portion of a vehicle, such as an aircraft, an automobile, a watercraft, a spacecraft, and the like. According to other examples, the part 130 forms all or a portion of a non-mobile structure, such as a building, a bridge, a tower, and the like. The bonded joint 136 of the part 130 includes a first layer 132, a second layer 134, and a bond 138 between the first layer 132 and the second layer 134. The bond 138 bonds the first layer 132 to the second layer 134, or vice versa. Generally, the bond 138 defines a bond line between the first layer 132 and the second layer 134. In certain examples, the bond 138 is configured to permanently bond together the first layer 132 and the second layer 134. In one example, the bond 138 is an adhesive bond made of an adhesive material, such as an epoxy, resin, or glue. In another example, the bond 138 is a heat bond or weldment made of the melted materials of the first layer 132 and the second layer 134, and optionally a filler material. Accordingly, the bond 138 can be made of a material that is the same material as or a different material than the materials of the first layer 132 and the second layer 134.

The first layer 132 and the second layer 134 are made of an electrically-conductive material. As used herein, an electrically-conductive material is a material that enables the transmission of an electromagnetic shockwave through the material. In some examples, the first layer 132 and/or the second layer 134 are partially or entirely made of a metallic material. In other examples, the first layer 132 and/or the second layer 134 are partially or entirely made of a graphite-fiber reinforced polymer material, such as a carbon-fiber reinforced polymer material or a metallic-fiber reinforced polymer material.

As used herein, a kissing bond 148 is a portion of the bond 138 where the bond 138 is in intimate or direct contact with the first layer 132 and the second layer 134, but is either (1) not bonded to one or both of the first layer 132 and the second layer 134; or (2) the bond 138 has a bond strength below an acceptable level. In other words, to many conventional inspection techniques, a kissing bond 148 has the appearance of a healthy bond. However, the bonding performance of a kissing bond 148 is less than a healthy bond. For this reason, to promote an expected performance of parts, manufacturers would be encouraged to detect the presence of kissing bonds in new parts before putting the new parts into operation and operators of parts already in operation would be encouraged to detect the presence of kissing bonds in such in-use parts.

The system 100 is configured to detect the presence of kissing bonds in bonded joints of parts in an accurate, a simple, and an inexpensive manner. The system 100 includes a detection assembly 110 and a controller 120. The detection assembly 110 includes an electromagnetic shockwave generator 114 and an ultrasonic sensor 116. The electromagnetic shockwave generator 114 and the ultrasonic sensor 116 cooperate to create and detect a void 135 (e.g., small air gap) in the bonded joint 136. The detection of the void 135 by the detection assembly 110 indicates the existence of a kissing bond 148 in the bonded joint 136 at the location of the void 135. When a kissing bond 148 is detected by the detection assembly 110, in some examples, the bonded joint 136 is scraped or repaired.

Figure 2:
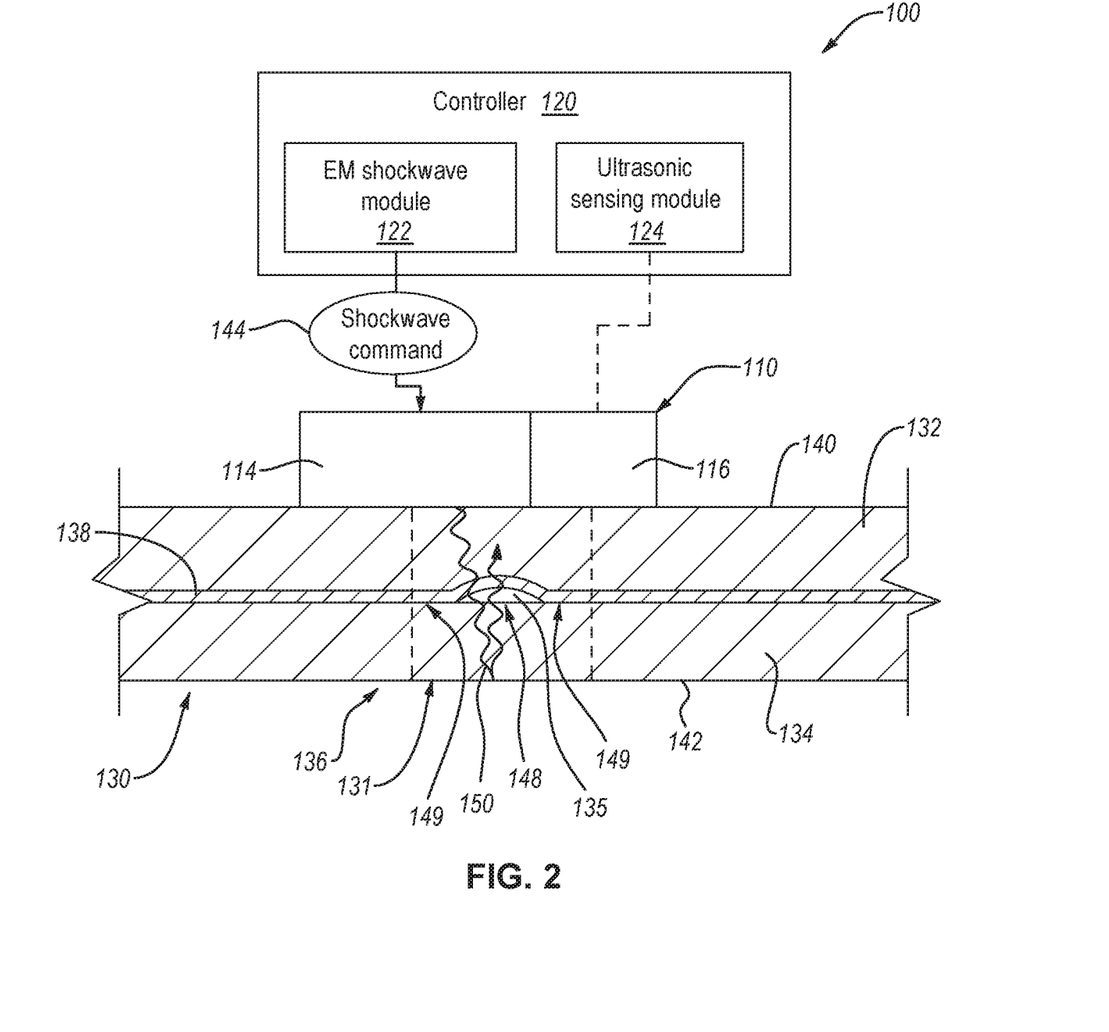
FIG. 2 is a schematic, elevation view of the system of FIG. 1, showing an electromagnetic shockwave transmitted through a target portion of the bonded joint, according to one or more examples of the present disclosure.

Referring to FIG. 2, the electromagnetic shockwave generator 114 is configured to generate an electromagnetic shockwave 150 through a target portion 131 of the bonded joint 136. The target portion 131 of the bonded joint 136 is any targeted portion of the bonded joint 136 in which inspection for kissing joints is desired. The target portion 131 takes up a corresponding target area on a first surface 140 or a second surface 142 of the bonded joint 136. The target portion 131 is identified in the figures between hypothetical dashed lines.

In some examples, the electromagnetic shockwave generator 114 is an electrically-powered device capable of generating an electromagnetic shockwave, having a selectively controllable intensity, through the bonded joint 136. According to one example, the electromagnetic shockwave generator 114 utilizes electrical power to generate the electromagnetic shockwave 150 by utilizing an electromagnetic field as a force field to generate a pulling force. Therefore, in some examples, the electromagnetic shockwave generator 114 includes an electromagnetic dent remover, which is designed to remove dents in metallic panels.

The basic operating procedure of the electromagnetic shockwave generator 114 (e.g., a dent remover) includes discharging two capacitor banks of the electromagnetic shockwave generator 114 into a coil of the electromagnetic shockwave generator 114. In operation, the two capacitors (slow and fast bank) are charged, the coil is placed against the target structure, and the capacitors are then fired by a set of triggers. During the firing process, the slow bank creates a magnetic field in the material. After approximately 2 ms, the fast bank capacitors are dumped (fired) into the coil circuit in the opposite direction. As the slow bank thus attempts to stop current flow or change the current flow instantaneously, it thereby eliminates the magnetic field in the coil and the material. The magnetic field is instantaneously cut in half in the coil and at the face of the coil. Due to the principle of steady state energy, the material generates its own eddy current to maintain its current state of energy. The result is a differential magnetic field (force) from the front coil to the back of the material (see, e.g., FIG. 1) thus generating a tension pulse toward the coil face, and pulling the first layer 132 (e.g., dent) with it.

Accordingly, the electromagnetic shockwave 150 includes an electrical component and a magnetic component. The electromagnetic shockwave 150 is generated and transmitted as a relatively short pulse. Accordingly, the electromagnetic shockwave generator 114 does not generate a continuous electromagnetic shockwave. Rather, the electromagnetic shockwave 150 is an electromagnetic pulse with a short duration, such as between 1 ms and 3 ms, in some examples.

The electromagnetic shockwave generator 114 is controlled to generate an electromagnetic shockwave 150 that has an intensity sufficient to induce a separation of a kissing bond 148 in the target portion 131 and insufficient to induce a separation of a healthy bond 149, adjacent the kissing bond 148, in the target portion 131. The electromagnetic shockwave 150, with such an intensity, will cause a kissing bond 148 in the target portion 131 to temporarily separate and form the void 135, while keeping healthy bonds 149 intact and unaffected. In some examples, the intensity of the electromagnetic shockwave 150 is proportional to the voltage of the pulse of electrical power supplied to the electromagnetic shockwave generator 114. Accordingly, the intensity of the electromagnetic shockwave 150 is adjustable by adjusting the voltage of the supplied pulse of electrical power. Separation of the kissing bond 148 is caused by the tensile force, created by the electromagnetic shockwave 150 as the electromagnetic shockwave 150 travels through the target portion 131, acting on the kissing bond 148 to effectively pull the kissing bond 148 apart. The tensile force is created in response to the electrical shockwave 150 electromagnetically interacting with the electrically-conductive materials of the first layer 132 and the second layer 134. Moreover, the tensile force is proportional to the intensity of the electromagnetic shockwave 150.

The separation of the kissing bond 148 to form the void 135 can occur in a couple of ways. In one example, the kissing bond 148 separates at the bond interface between the bond 138 and the first layer 132, such that the void 135 is defined directly between the bond 138 and the first layer 132. In another example, as shown in FIG. 2, the kissing bond 148 separates at the bond interface between the bond 138 and the second layer 134, such that the void 135 is defined directly between the bond 138 and the second layer 134. According to an alternative example, where the bond 138 includes internal weakness or abnormalities, the kissing bond 148 separates from within the bond 138, thus creating two separated portions of the bond 138, such that the void 135 is defined directly between the separated portions of the bond 138.

Figure 3:
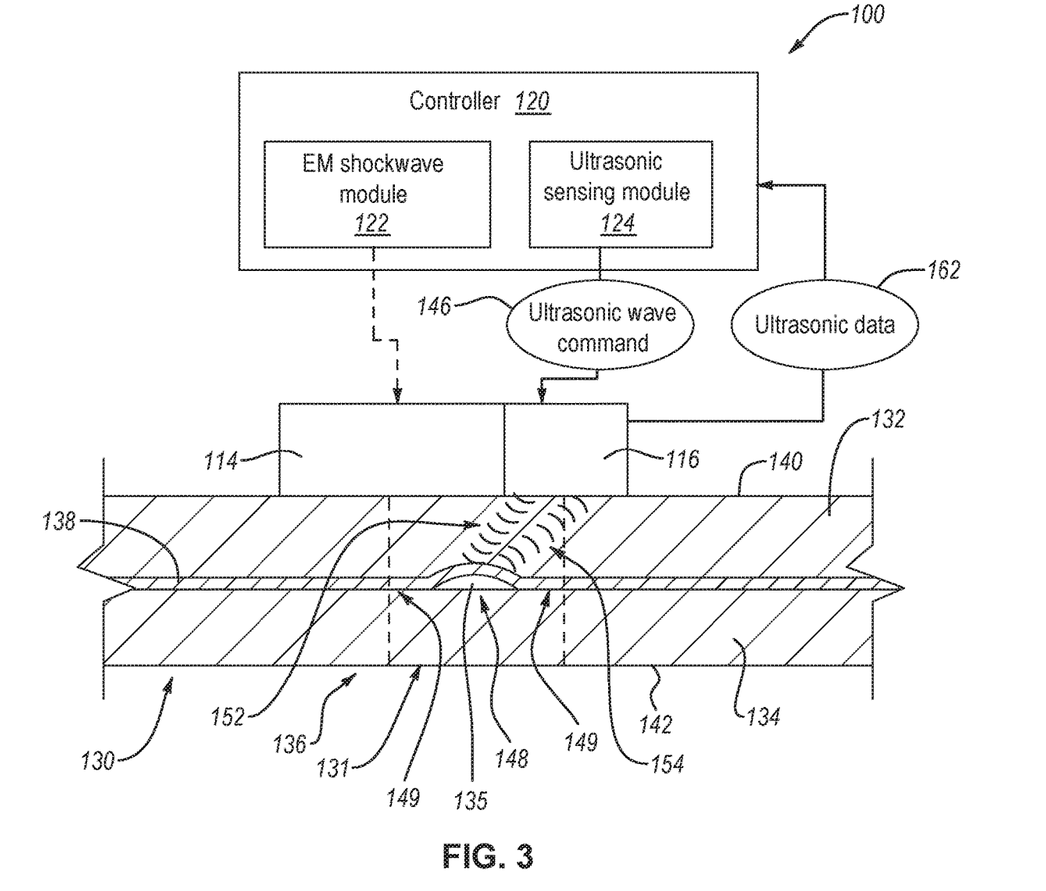
FIG. 3 is a schematic, elevation view of the system of FIG. 1, showing an ultrasonic pulse transmitted through the target portion of the bonded joint and a corresponding ultrasonic echo transmitted from the target portion of the bonded joint, according to one or more examples of the present disclosure.

Referring to FIG. 3, the ultrasonic sensor 116 of the detection assembly 110 is configured to generate a transmitted ultrasonic pulse 152, direct the transmitted ultrasonic pulse 152 into the target portion 131 of the bonded joint 136, and receive a received ultrasonic pulse 154 from the target portion 131 of the bonded joint 136 in response to the electromagnetic shockwave generator 114 generating the electromagnetic shockwave 150 through the target portion 131 of the bonded joint 136. Accordingly, the ultrasonic sensor 116 includes an ultrasonic pulse generator and an ultrasonic pulse detector. In some examples, the ultrasonic pulse generator and the ultrasonic pulse detector are transducers that are physically separate from each other. For example, the ultrasonic pulse generator can be a stand-alone ultrasonic transmitter and the ultrasonic pulse detector can be a stand-alone ultrasonic receiver. However, in other examples, the ultrasonic pulse generator and the ultrasonic pulse detector are integrated into the same transducer. For example, the ultrasonic sensor 116 can include an ultrasonic transceiver. In certain examples, the ultrasonic sensor 116 includes an array of ultrasonic pulse generators (e.g., transducers) and an array of ultrasonic pulse detectors (e.g., transducers).

Whether one or multiple ultrasonic pulse generators, each ultrasonic pulse generator is configured to convert electrical power into the transmitted ultrasonic pulse 152 and, whether one or multiple ultrasonic pulse detectors, each ultrasonic pulse detector is configured to covert the received ultrasonic pulse 154 into an electrical signal. In some examples, each ultrasonic pulse generator and/or receiver is a piezoelectric transducer or a capacitive transducer. A piezoelectric transducer for generating the transmitted ultrasonic pulse 152 includes one or more piezoelectric crystals that change size and/or shape when electrical power is applied, which makes the crystals oscillate and produce the transmitted ultrasonic pulse 152. In contrast, a piezoelectric transducer for detecting the received ultrasonic pulse 154 includes one or more piezoelectric crystals that generate electrical voltage when acted upon (e.g., oscillated) by the received ultrasonic pulse 154. In some examples, as explained, the crystals of one or more piezoelectric transducers both oscillate to generate the transmitted ultrasonic pulse 152 and alternatively oscillate in the presence of the received ultrasonic pulse 154 to detect the received ultrasonic pulse 154.

Figure 4:
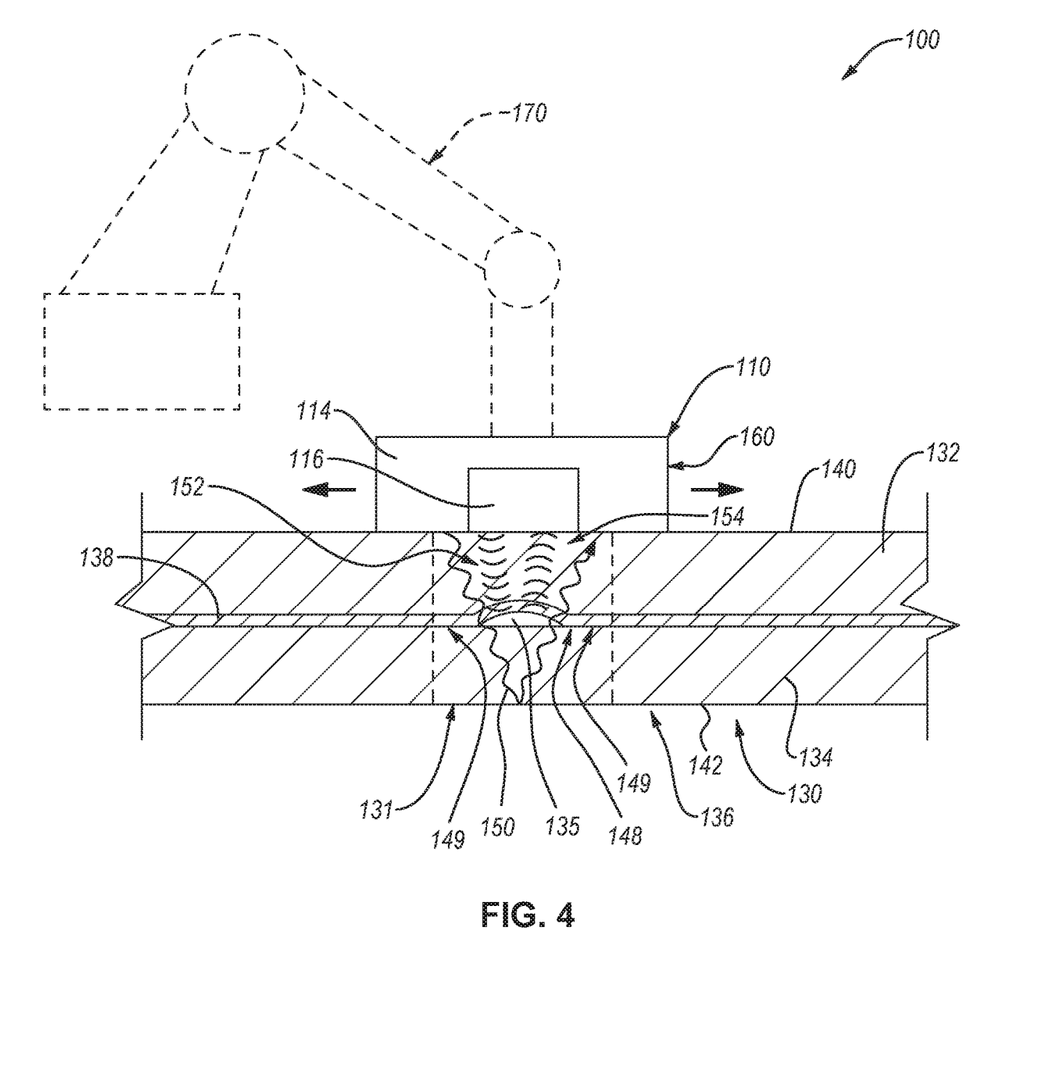
FIG. 4 is a schematic, elevation view of a system for detecting kissing bonds in a bonded joint of a part, according to one or more examples of the present disclosure.

As shown in FIGS. 3 and 4, the ultrasonic sensor 116 is a pulse echo (PE) ultrasonic sensor in some examples. Accordingly, the ultrasonic pulse detector of the ultrasonic sensor 116 is located on the same side of the part 130 (e.g., adjacent the first surface 140 of the part 130) as the ultrasonic pulse generator. When a kissing bond 148 is present, at least a portion of the transmitted ultrasonic pulse 152 directed into the target portion 131 is reflected off the void 135 that is formed when the kissing bond 148 is separated. The portion of the transmitted ultrasonic pulse 152 that is reflected off the void 135, which can be defined as an ultrasonic echo, becomes the received ultrasonic pulse 154. The remaining portion of the transmitted ultrasonic pulse 152 transmits through the rest of the target portion 131 of the bonded joint 136 of the part 130. The ultrasonic pulse detector of the ultrasonic sensor 116, being on the same side of the part 130 as the ultrasonic pulse generator, is in position to receive and detect the received ultrasonic pulse 154.

Figure 5:
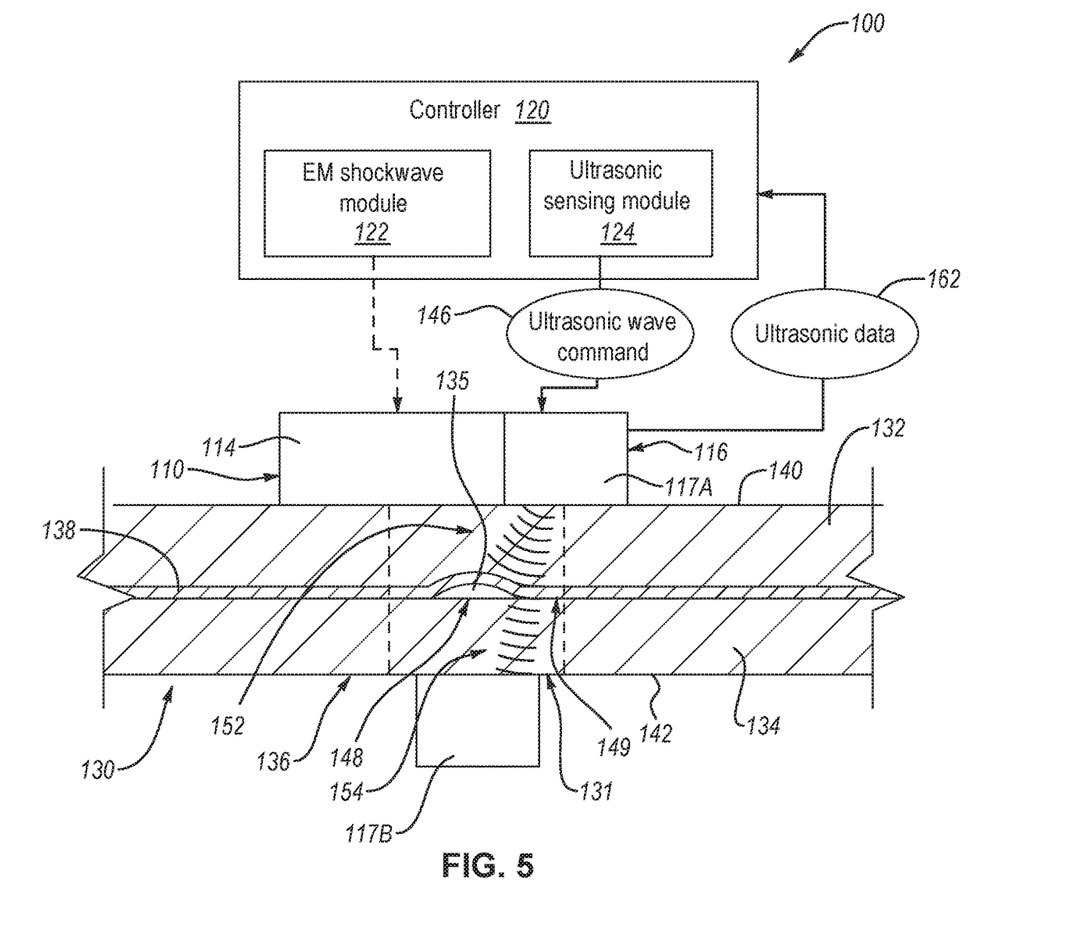
FIG. 5 is a schematic, elevation view of a system for detecting kissing bonds in a bonded joint of a part, according to one or more examples of the present disclosure.

As shown in FIG. 5, the ultrasonic sensor 116 is a through transmission ultrasonic (TTU) sensor in some examples. Accordingly, the ultrasonic sensor 116 includes a transmission portion 117A located adjacent the first surface 140 of the part 130 and a detection portion 117B located on the opposite side of the part 130 (e.g., adjacent the second surface 142 of the part 130). When a kissing bond 148 is present, at least a portion of the transmitted ultrasonic pulse 152 directed into the target portion 131 is reflected off of or blocked by the void 135 that is formed when the kissing bond 148 is separated. The portion of the transmitted ultrasonic pulse 152 that is not blocked by the void 135 and transmits past the void 135 becomes the received ultrasonic pulse 154. The detection portion 117B of the ultrasonic sensor 116, being on the opposite side of the part 130 as the transmission portion 117A of the ultrasonic sensor 116, is in position to receive and detect the received ultrasonic pulse 154 passing through the part 130.

According to some examples, the electromagnetic shockwave generator 114 is directly contactable with the part 130 when the electromagnetic shockwave generator 114 generates the electromagnetic shockwave 150 and when the ultrasonic sensor 116 generates the transmitted ultrasonic pulse 152, directs the transmitted ultrasonic pulse 152 into the target portion 131 of the bonded joint 136, and receives the received ultrasonic pulse 154 from the target portion 131 of the bonded joint 136. In one example, the tensile force for separating the kissing bond 148 is created by utilizing the contact between the electromagnetic shockwave generator 114 and the part 130. While the ultrasonic sensor 116 does not need to be in direct contact with the part 130 to generate and direct the ultrasonic pulse 152 into the part 130, in certain examples, both the electromagnetic shockwave generator 114 and the ultrasonic sensor 116 are in direct contact with the part 130.

The detection assembly 110 is movable along the part 130 in some examples. As used herein, the detection assembly 110 is movable along the part 130 when the detection assembly 110 is not permanently fixed to the part 130 (e.g., not fastened or adhered to the part 130) and is capable of freely moving along the part 130 from one location to the next to allow detection of kissing bonds 148 at multiple locations along the part 130.

In some examples, the detection assembly 110 is movable manually, such as by being moved by the hand or hands of an operator. In such examples, the detection assembly 110 includes a handle graspable by an operator to move the detection assembly 110 relative to the part 130.

In other examples, the detection assembly 110 movable in an automated manner. Referring to FIG. 4, the system 100 further includes a robot 170 and a probe head 160 fixed to and movable by the robot 170. The robot 170 can be any of various programmable robots, such as robotic arms having multiple, independently articulatable, links or segments. The robot 170 is programmed to move the probe head 160 along the part 130 from one location to the next. In these examples, the detection assembly 110 forms at least part of the probe head 160 such that the robot 170 is configured to move the detection assembly 110 from one location to the next along the part 130. At each location, the detection assembly 110 can detect the presence of kissing bonds 148 in the part 130 before being moved to another location to perform the same kissing bond detection process.

The electromagnetic shockwave generator 114 and the ultrasonic sensor 116 of the detection assembly 110 are non-movably fixed relative to each other in some examples. In other words, in some examples, the ultrasonic sensor 116 moves only with movement of the electromagnetic shockwave generator 114. In one example, as shown in FIG. 4, the ultrasonic sensor 116 is integrated into the electromagnetic shockwave generator 114, such as by coupling the ultrasonic sensor 116 to a housing of the electromagnetic shockwave generator 114.

According to other examples, the electromagnetic shockwave generator 114 and the ultrasonic sensor 116 of the detection assembly 110 are movable relative to each other. Accordingly, the electromagnetic shockwave generator 114 and the ultrasonic sensor 116 can be independently moved into position relative to each other at a location for detecting kissing bonds 148 in the part 130. Separate movement of the electromagnetic shockwave generator 114 and the ultrasonic sensor 116 can be performed manually or autonomously.

The controller 120 of the system 100 is configured to synchronize the generation of the transmitted ultrasonic pulse 152 relative to the generation of the electromagnetic shockwave 150. In some examples, the controller 120 is integrated into (e.g., onboard) the detection assembly 110 such that the controller 120 co-moves with the detection assembly 110. However, in other examples, the controller 120 is physically separate or remote from the detection assembly 110 such that the controller 120 does not necessarily move when the detection assembly 110 moves. For example, the controller 120 can form part of a stand-alone computer system that is communicatively coupled with the detection assembly 110 via a wired or wireless connection.

The controller 120 includes an electromagnetic (EM) shockwave module 122 and an ultrasonic sensing module 124. Generally, the EM shockwave module 122 controls operation of the electromagnetic shockwave generator 114 and the ultrasonic sensing module 124 controls operation of the ultrasonic sensor 116.

More specifically, as shown in FIG. 2, the EM shockwave module 122 is configured to transmit a shockwave command 144 to the electromagnetic shockwave generator 114 and the electromagnetic shockwave generator 114 is configured to generate the electromagnetic shockwave 150 in response to receiving the shockwave command 144. The shockwave command 144 includes desired characteristics of the electromagnetic shockwave 150, such as intensity (e.g., voltage) and pulse duration. In response to the shockwave command 144, the electromagnetic shockwave generator 114 generates the electromagnetic shockwave 150 with the desired characteristics.

As shown in FIG. 3, the ultrasonic sensing module 124 is configured to automatically transmit an ultrasonic wave command 146 to the ultrasonic sensor 116 in response to the transmission of the shockwave command 144 by the EM shockwave module 122 and the ultrasonic sensor 116 is configured to generate the transmitted ultrasonic pulse 152 in response to receiving the ultrasonic wave command 146. The ultrasonic wave command 146 includes desired characteristics of the transmitted ultrasonic pulse 152, such as amplitude and frequency. In response to the ultrasonic wave command 146, the ultrasonic sensor 116 generates the transmitted ultrasonic pulse 152 with the desired characteristics.

Referring to FIGS. 3 and 5, in certain examples, after the ultrasonic pulse detector of the ultrasonic sensor 116 receives the received ultrasonic pulse 154, the ultrasonic sensor 116 transmits ultrasonic data 162 to the ultrasonic sensing module 124 of the controller 120. The ultrasonic data 162 includes information corresponding with one or more characteristics of the received ultrasonic pulse 154. According to some examples, the one or more characteristics of the received ultrasonic pulse 154 includes a signal response (e.g., amplitude, frequency, intensity, phase (timing), etc.) measured by the ultrasonic pulse detector of the ultrasonic sensor 116. In another example, corresponding with a PE ultrasonic sensor, the one or more characteristics of the received ultrasonic pulse 154 includes a depth in the bonded joint 136 at which the received ultrasonic pulse 154, in the form of an pulse echo, is generated. The ultrasonic sensing module 124 is further configured to detect a kissing bond 148 in the bonded joint 136 based on at least the ultrasonic data 162. Some examples of a method 200 of detecting the kissing bond 148 employed by the ultrasonic sensing module 124 are described below.

Figure 6:
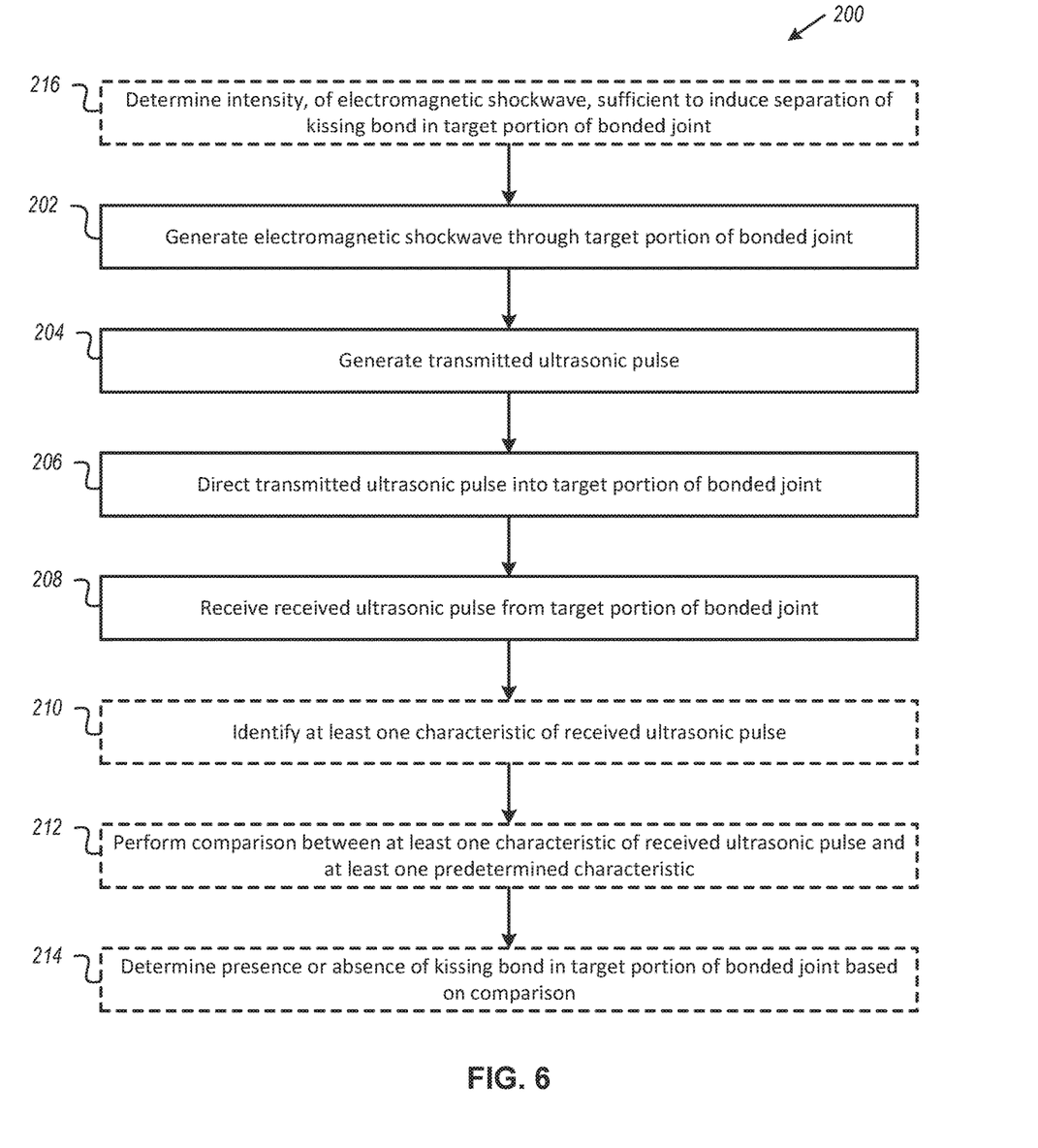
FIG. 6 is a block diagram of a method of detecting kissing bonds in a bonded joint of a part, according to one or more examples of the present disclosure.

As shown in FIG. 6, according to some examples, the method 200 includes (block 202) generating the electromagnetic shockwave 150 through the target portion 131 of the bonded joint 136. According to the method 200, the electromagnetic shockwave 150 has an intensity sufficient to induce a separation of a kissing bond 148 in the target portion 131 and insufficient to induce a separation of a healthy bond 149, adjacent the kissing bond 148, in the target portion 131. In certain examples, the method 200 further comprises (block 216) determining the intensity of the electromagnetic shockwave 150 that is sufficient to induce a separation of a kissing bond 148 in the target portion 131 of the bonded joint 136.

According to one example, the intensity of the electromagnetic shockwave 150 sufficient to induce a separation of a kissing bond 148 is determined at block 216 by generating test electromagnetic shockwaves through a target portion of a bonded joint of a test part and incrementally increasing an intensity of each one of the test electromagnetic shockwaves while monitoring the test part for visual signs of anomalies. The test part replicates the part 130 so as to provide a physical copy of the part 130. The test electromagnetic shockwaves begin with an initial test electromagnetic shockwave having an initial intensity (e.g., initial voltage). After the initial test electromagnetic shockwave is transmitted through the test part, the test part is inspected for visual signs of anomalies. The transmission of an electromagnetic shockwave through a part generates heat in the part. Burn or heat anomalies in the part, which is usually visible to an inspector, can occur if the heat generated is too high. Accordingly, in certain implementations, the test part is inspected for heat anomalies. If heat anomalies are present in the test part, then the intensity of the electromagnetic shockwave is too high for detecting kissing bonds 148 in the part 130. If no heat anomalies are present in the test part, then a new electromagnetic shockwave, having an increased intensity, is transmitted through the test part and the test part is once again inspected for heat anomalies.

The incremental increasing of the intensity of the test electromagnetic shockwaves is continued until either visual signs of anomalies are present or the intensity reaches a predetermined threshold intensity corresponding with a tensile force resistance limit of a healthy bond 149 in the part 130. The intensity of the test electromagnetic shockwave just prior to the test electromagnetic shockwave that resulted in a visual sign of anomalies is initially selected as the intensity of the electromagnetic shockwave 150 sufficient to induce a separation of a kissing bond 148.

In certain examples, the intensity of the electromagnetic shockwave 150 sufficient to induce a separation of a kissing bond 148 is further determined at block 216 by measuring a temperature of the test part after each incremental increase in the intensity of the test electromagnetic shockwaves. Additionally, according to some examples, block 216 further includes waiting to generate a subsequent one of the test electromagnetic shockwaves until after the temperature of the test part is at or below a predetermined threshold temperature. In one example, the predetermined threshold temperature is 120° F. or dependent on the materials of the test part. Because the test electromagnetic shockwaves generate heat in the test part, without waiting for the test part to cool down, the heat can build up and cause the test part to reach temperatures that the materials of the test part are incapable of withstanding without a breakdown of the properties of the materials.

In certain examples, the intensity of the electromagnetic shockwave 150 sufficient to induce a separation of a kissing bond 148 is further determined at block 216 by inspecting the test part for structural anomalies. After the intensity of the electromagnetic shockwave 150 sufficient to induce a separation of a kissing bond 148 is initially selected by incrementally increasing the intensity of test electromagnetic shockwaves, to ensure that the initially selected intensity will not cause non-visible structural anomalies in the part 130, the test part undergoes a structural test (e.g., tensile test, compression test, and the like). If the test part passes the structural test, then the initially selected intensity is determined at 216 as the electromagnetic shockwave 150 sufficient to induce a separation of a kissing bond 148.

The intensity of the electromagnetic shockwave 150, sufficient to induce a separation of a kissing bond 148, is insufficient to induce a separation of a healthy bond 149 when the intensity is below an intensity associated with a predetermined tensile force resistance limit of a healthy bond 149 (e.g., the maximum tensile force that a healthy bond 149 is capable of withstanding before breaking down and separating). This predetermined maximum tensile force of the bond 138 is based on known characteristics of the bond 138, the first layer 132, and the second layer 134 of the bonded joint 136 and can be determined through tensile tests of a test part.

Still referring to FIG. 6, according to some examples, the method 200 includes (block 204) generating the transmitted ultrasonic pulse 152, (block 206) directing the transmitted ultrasonic pulse 152 into the target portion 131 of the bonded joint 136, and (block 208) receiving the received ultrasonic pulse 154 from the target portion 131 of the bonded joint 136. Blocks 204-208 of the method 200 are executed in response to generating the electromagnetic shockwave 150 through the target portion 131 of the bonded joint 136 at block 202. In some examples, the steps of blocks 204-208 are executed contemporaneously with the step of block 202. In other words, there is at least some temporal overlap between the step of block 202 and the steps of blocks 204-208. In one example, the step of block 202 is executed first and the steps of blocks 204-208 are executed consecutively after the step of block 202 is initiated. The delay in executing block 204 after executing block 202 is dependent on the thickness and type of material of the bonded joint 136 of the part 130. In some implementations, the step of block 204 is executed after the step of block 202 in order to provide enough time for any kissing bonds 148 to separate before generating the transmitted ultrasonic pulse 152 and directing the transmitted ultrasonic pulse 152 into the target portion 131 of the bonded joint 136.

According to some examples, the method 200 further includes (block 210) identifying at least one characteristic of the received ultrasonic pulse 154, (block 212) performing a comparison between the at least one characteristic of the received ultrasonic pulse 154 and at least one predetermined characteristic, and (block 214) determining a presence or absence of a kissing bond 148 in the target portion 131 of the bonded joint 136 based on the comparison. The comparison at block 212 is performed by the ultrasonic sensing module 124, in some examples, based on the ultrasonic data 162 received from the ultrasonic sensor 116.

In one example, the at least one characteristic of the received ultrasonic pulse 154 includes a measured signal response of the received ultrasonic pulse 154. The measured signal response includes one or more of a measured frequency, a measured amplitude, and a measured phase (e.g., measured timing) of the received ultrasonic pulse 154. Similarly, the at least one predetermined characteristic includes a predetermined signal response, which can be one or more of a predetermined frequency, a predetermined amplitude, and a predetermined phase (e.g., predetermined timing). The predetermined characteristics are associated with expected characteristics of the received ultrasonic pulse 154 under predetermined bond conditions in the target portion 131 of the bonded joint 136 of the part 130. In one example, the predetermined bond conditions include only healthy bonds 149 in the target portion 131 of the bonded joint 136 such that the predetermined signal response would be the expected signal response if all the bonds 138 in the target portion 131 are healthy. Accordingly, if the measured signal response of the received ultrasonic pulse 154 does not correlate with (e.g., is not equal to) the predetermined signal response, then the comparison leads to a determination that a kissing bond 148 is present, and vice versa. Of course, the opposite can be true in some examples, where the predetermined bond condition is that at least one kissing bond is present in the target portion 131, such that if the measured signal response of the received ultrasonic pulse 154 correlates with the predetermined signal response, then the comparison leads to a determination that a kissing bond 148 is present, and vice versa.

In one example, associated with a PE ultrasonic sensor, such as shown in FIGS. 2 and 3, the measured characteristic of the received ultrasonic pulse 154 is a measured depth within the bonded joint 136 at which the received ultrasonic pulse 154 is initiated (e.g., reflects off of a void 135). Correspondingly, the predetermined characteristic is an entire thickness of the target portion 131 of the bonded joint 136 of the part 130. The absence of a kissing bond 148 is determined at block 214 when the measured depth is equal to the entire thickness of the target portion 131 of the bonded joint 136 of the part 130. In contrast, the presence of a kissing bond 148 is determined at block 214 when the measured depth is less than the entire thickness of the target portion 131 of the bonded joint 136 of the part 130.

According to some examples, the method 200 further includes co-moving the electromagnetic shockwave generator 114 and the ultrasonic sensor 116 into a position in which the electromagnetic shockwave 150 directly contacts the target portion 131 of the bonded joint 136. After co-moving the electromagnetic shockwave generator 114 and the ultrasonic sensor 116 in this manner, the electromagnetic shockwave generator 114 can generate the electromagnetic shockwave 150 through the target portion 131 and the ultrasonic sensor 116 can generate the transmitted ultrasonic pulse 152 into the target portion 131. Subsequently, the method 200 includes co-moving the electromagnetic shockwave generator 114 and the ultrasonic sensor 116 into another position in which the electromagnetic shockwave 150 directly contacts a different target portion 131 of the bonded joint 136. After co-moving the electromagnetic shockwave generator 114 and the ultrasonic sensor 116 in this manner, the electromagnetic shockwave generator 114 can generate the electromagnetic shockwave 150 through the different target portion 131 and the ultrasonic sensor 116 can generate the transmitted ultrasonic pulse 152 into the different target portion 131. This sequence can be repeated until a desired quantity of target portions of the bonded joint 136 are inspected for kissing bonds.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagram. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the examples may be combined in any suitable manner. In the above description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and program products according to various examples. In this regard, each block in the schematic flowchart diagrams and/or schematic block diagrams may represent a module, segment, or portion of code, which comprises one or more executable instructions of the code for implementing the specified logical function(s).

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed:

1. An assembly comprising:
   an electromagnetic shockwave generator, configured to generate an electromagnetic shockwave through a target portion of the bonded joint, wherein the electromagnetic shockwave has a predetermined intensity that is known to be sufficient to induce a separation of a kissing bond in the target portion of the bonded joint and insufficient to induce a separation of a healthy bond, adjacent the kissing bond, in the target portion; and
   an ultrasonic sensor, configured to generate a transmitted ultrasonic pulse, direct the transmitted ultrasonic pulse into the target portion of the bonded joint, and receive a received ultrasonic pulse from the target portion of the bonded joint in response to the electromagnetic shockwave generator generating the electromagnetic shockwave through the target portion of the bonded joint.

2. The assembly according to claim 1, wherein the assembly is movable along the part.

3. The assembly according to claim 2, wherein the electromagnetic shockwave generator and the ultrasonic sensor are non-movably fixed relative to each other.

4. The assembly according to claim 3, wherein the ultrasonic sensor is integrated into the electromagnetic shockwave generator.

5. The assembly according to claim 1, wherein the electromagnetic shockwave generator comprises an electromagnetic dent remover.

6. The assembly according to claim 1, wherein the electromagnetic shockwave generator is directly contactable with the part when the electromagnetic shockwave generator generates the electromagnetic shockwave and when the ultrasonic sensor generates the transmitted ultrasonic pulse, directs the transmitted ultrasonic pulse into the target portion of the bonded joint, and receives the received ultrasonic pulse from the target portion of the bonded joint.

7. The detection assembly according to claim 1, wherein the electromagnetic shockwave generator and the ultrasonic sensor are co-movable into a position in which the electromagnetic shockwave directly contacts the target portion of the bonded joint.

8. The detection assembly according to claim 7, wherein, when in the position, the electromagnetic shockwave generator generates the electromagnetic shockwave through the target portion of the bonded joint and the ultrasonic sensor generates the transmitted ultrasonic pulse and transmits the ultrasonic pulse into the target portion of the bonded joint.

9. A system for detecting kissing bonds in a bonded joint of a part, the system comprising:

a detection assembly, comprising:
an electromagnetic shockwave generator, configured to generate an electromagnetic shockwave through a target portion of the bonded joint, wherein the electromagnetic shockwave has a predetermined intensity that is known to be sufficient to induce a separation of a kissing bond in the target portion of the bonded joint and insufficient to induce a separation of a healthy bond, adjacent the kissing bond, in the target portion; and
an ultrasonic sensor, configured to generate a transmitted ultrasonic pulse, direct the transmitted ultrasonic pulse into the target portion of the bonded joint, and receive a received ultrasonic pulse from the target portion of the bonded joint in response to the electromagnetic shockwave generator generating the electromagnetic shockwave through the target portion of the bonded joint; and
a controller, configured to synchronize the generation of the transmitted ultrasonic pulse relative to the generation of the electromagnetic shockwave.

10. The system according to claim 9, wherein:
the controller comprises an EM shockwave module and an ultrasonic sensing module;
the EM shockwave module is configured to transmit a shockwave command to the electromagnetic shockwave generator;
the electromagnetic shockwave generator is configured to generate the electromagnetic shockwave in response to receiving the shockwave command;
the ultrasonic sensing module is configured to automatically transmit an ultrasonic wave command to the ultrasonic sensor in response to the transmission of the shockwave command by the EM shockwave module; and
the ultrasonic sensor is configured to generate the transmitted ultrasonic pulse in response to receiving the ultrasonic wave command.

11. The system according to claim 10, wherein:
the ultrasonic sensor is further configured to transmit ultrasonic data, corresponding with one or more characteristics of the received ultrasonic pulse received by the ultrasonic sensor; and
the ultrasonic sensing module is further configured detect a kissing bond in the bonded joint based on at least the ultrasonic data.

12. The system according to claim 9, wherein:
the electromagnetic shockwave generator and the ultrasonic sensor form a probe head;
the system further comprises a robot; and
the probe head is fixed to and movable, along the part, by the robot.

13. A method of detecting kissing bonds in a bonded joint of a part, the method comprising:
generating an electromagnetic shockwave through a target portion of the bonded joint, wherein the electromagnetic shockwave has an intensity sufficient to induce a separation of a kissing bond in the target portion of the bonded joint and insufficient to induce a separation of a healthy bond, adjacent the kissing bond, in the target portion;
in response to generating the electromagnetic shockwave through the target portion of the bonded joint:
generating a transmitted ultrasonic pulse;
directing the transmitted ultrasonic pulse into the target portion of the bonded joint; and
receiving a received ultrasonic pulse from the target portion of the bonded joint;
identifying at least one characteristic of the received ultrasonic pulse;
performing a comparison between the at least one characteristic of the received ultrasonic pulse and at least one predetermined characteristic; and
determining a presence or absence of a kissing bond in the target portion of the bonded joint based on the comparison,
wherein:
the bonded joint of the part comprises a first layer bonded to a second layer by a bond;
the bond within the target portion of the bonded joint comprises the kissing bond;
the electromagnetic shockwave separates the first layer from the second layer at the kissing bond to form a void between the first layer and the second layer; and
while the first layer and the second layer are separated by the electromagnetic shockwave, at least a portion of the transmitted ultrasonic pulse reflects off the void to form the received ultrasonic pulse.

14. The method according to claim 13, wherein:
the at least one characteristic of the received ultrasonic pulse comprises a measured signal response of the received ultrasonic pulse;
the at least one predetermined characteristic comprises a predetermined signal response;
the absence of a kissing bond is determined when the measured signal response is equal to the predetermined signal response; and
the presence of a kissing bond is determined when the measured signal response is not equal to the predetermined signal response.

15. The method according to claim 13, wherein the part is made of an electrically-conductive material.

16. The method according to claim 13, wherein:
the electromagnetic shockwave is generated by an electromagnetic shockwave generator; and
the electromagnetic shockwave generator is in direct contact with the part when the electromagnetic shockwave generator generates the electromagnetic shockwave and when the transmitted ultrasonic pulse is generated, the transmitted ultrasonic pulse is directed into the target portion of the bonded joint, and the received ultrasonic pulse is received from the target portion of the bonded joint.

17. The method according to claim 13, further comprising determining the intensity, of the electromagnetic shockwave, sufficient to induce a separation of a kissing bond in the target portion of the bonded joint by:
generating test electromagnetic shockwaves through a target portion of a bonded joint of a test part; and
incrementally increasing an intensity of each one of the test electromagnetic shockwaves while monitoring the test part for visual signs of anomalies.

18. The method according to claim 17, wherein the step of determining the intensity, of the electromagnetic shockwave, sufficient to induce a separation of a kissing bond in the target portion of the bonded joint further comprises:
measuring a temperature of the test part after each incremental increase in the intensity of the test electromagnetic shockwaves; and
waiting to generate a subsequent one of the test electromagnetic shockwaves until after the temperature of the test part is at or below a predetermined threshold temperature.

19. The method according to claim 17, wherein determining the intensity, of the electromagnetic shockwave, sufficient to induce a separation of a kissing bond in the target portion of the bonded joint further comprises inspecting the test part for structural anomalies.

20. The method according to claim 13, wherein:
- the electromagnetic shockwave is generated by an electromagnetic shockwave generator;
- the transmitted ultrasonic pulse is generated by an ultrasonic sensor;
- the transmitted ultrasonic pulse is directed by the ultrasonic sensor;
- the received ultrasonic pulse is received by the ultrasonic sensor; and
- the method further comprises co-moving the electromagnetic shockwave generator and the ultrasonic sensor into a position in which the electromagnetic shockwave directly contacts the target portion of the bonded joint.

* * * * *